US006453606B1

United States Patent
Shulman et al.

(10) Patent No.: US 6,453,606 B1
(45) Date of Patent: Sep. 24, 2002

(54) COLLAPSIBLE PLANT SUPPORT STRUCTURE

(76) Inventors: Norman Mark Shulman, 4015 88th Pl., Lubbock, TX (US) 79423; Grayson Mark Bass, 2807 21st St., Lubbock, TX (US) 79410

( * ) Notice: Subject to any disclaimer, the term of this patent is extended or adjusted under 35 U.S.C. 154(b) by 0 days.

(21) Appl. No.: 09/777,760

(22) Filed: Feb. 6, 2001

(51) Int. Cl.[7] .......................... A01G 17/06; A01G 17/14
(52) U.S. Cl. .................. 47/47; 47/44; 47/45; 248/175; 248/153; 211/198
(58) Field of Search ................................ 47/47, 45, 44, 47/41.14, 29.6, 70, 39; 248/175, 153; 211/198

(56) References Cited

U.S. PATENT DOCUMENTS

| | | | |
|---|---|---|---|
| 760,879 A | * | 5/1904 | Kunzman |
| 839,423 A | * | 12/1906 | Richards |
| 903,986 A | * | 11/1908 | Klahn et al. |
| 2,051,596 A | * | 8/1936 | Harbaugh |
| 2,557,731 A | * | 6/1951 | Eelsing |
| 3,299,569 A | | 1/1967 | Lemrick |
| 3,397,485 A | | 8/1968 | Peterson |
| 4,005,548 A | | 2/1977 | Nahon |
| 4,073,091 A | | 2/1978 | Vogel |
| 4,285,163 A | | 8/1981 | Booker |
| 4,667,438 A | | 5/1987 | Corell |
| 4,745,706 A | * | 5/1988 | Muza et al. ................... 47/47 |
| 5,174,060 A | | 12/1992 | Glamos |
| 5,179,799 A | * | 1/1993 | Hillestad ...................... 47/45 |
| 5,323,559 A | | 6/1994 | Allman |
| 5,544,446 A | | 8/1996 | Benson |
| 5,595,019 A | | 1/1997 | Foreman |
| 5,640,802 A | | 6/1997 | Elliot |
| 6,088,956 A | * | 7/2000 | Rocka ........................ 47/45 |

FOREIGN PATENT DOCUMENTS

| | | | |
|---|---|---|---|
| DE | 3415185 A1 | * 10/1985 | ............ A01G/9/12 |
| DE | 195 16 000 A1 | 11/1996 | |
| FR | 2 786 061 A | 5/2000 | |

OTHER PUBLICATIONS

"Texas Tomato Cages" Web Page (http://www.tomatocage.com).

* cited by examiner

*Primary Examiner*—Charles T. Jordan
*Assistant Examiner*—Andrea M. Valenti

(57) ABSTRACT

A collapsible plant support structure is described which provides a structure wherein a plant may be grown and properly supported. The collapsible plant support structure has three or more vertical members (11) connected to a plurality of rings (12) by guide hubs (18) on the vertical members, thusly providing the collapsible feature of the structure. A vertical member typically is rod-like and extends the entire length of the structure and has connection points (19) set equidistant along the vertical members. The vertical members also include a tapered (20) and angled staking structure to assist in strengthening the structure. The vertical members also have geometrically shaped footplates (20) to assist in placing the structure into any given terrain.

11 Claims, 5 Drawing Sheets

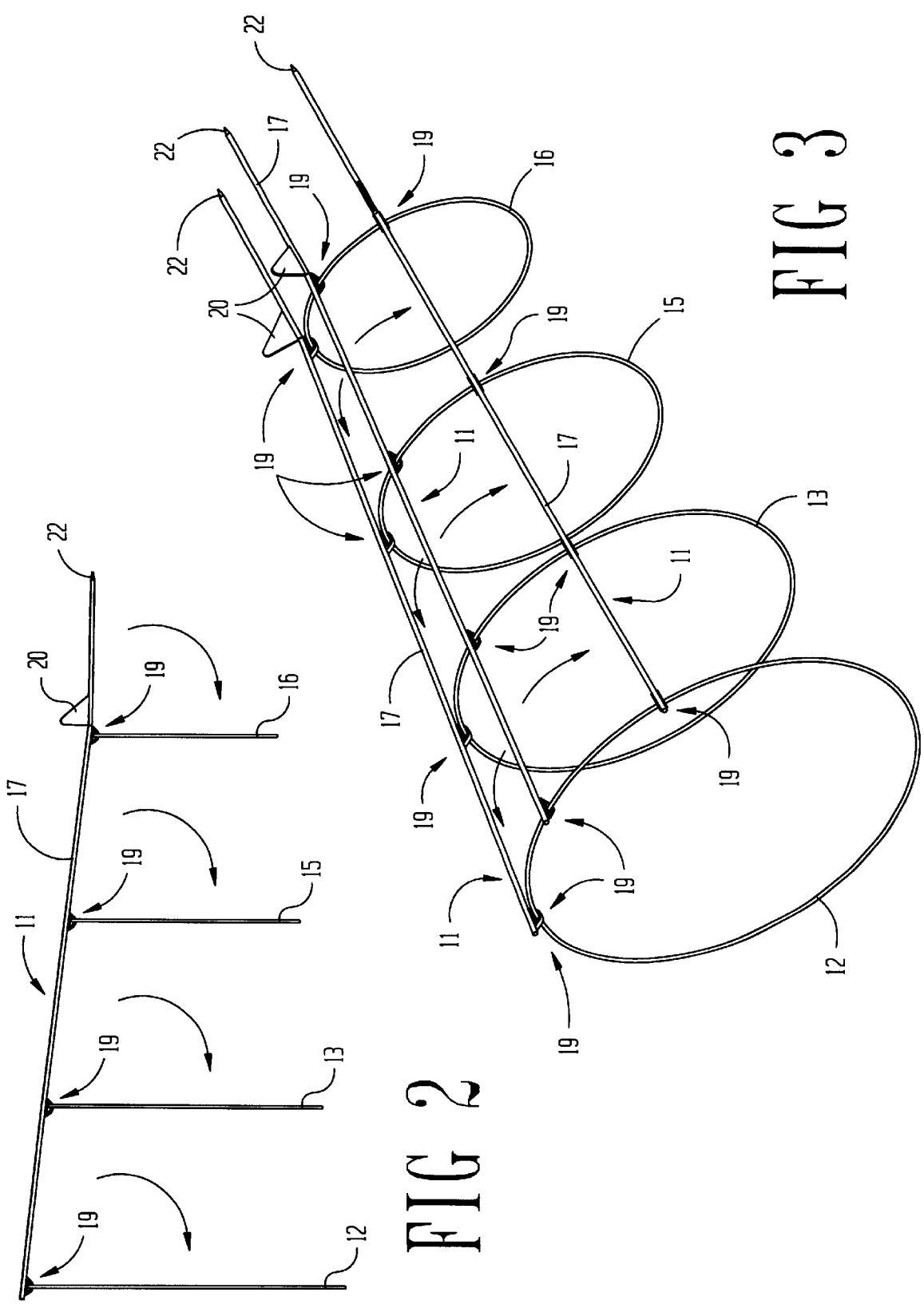

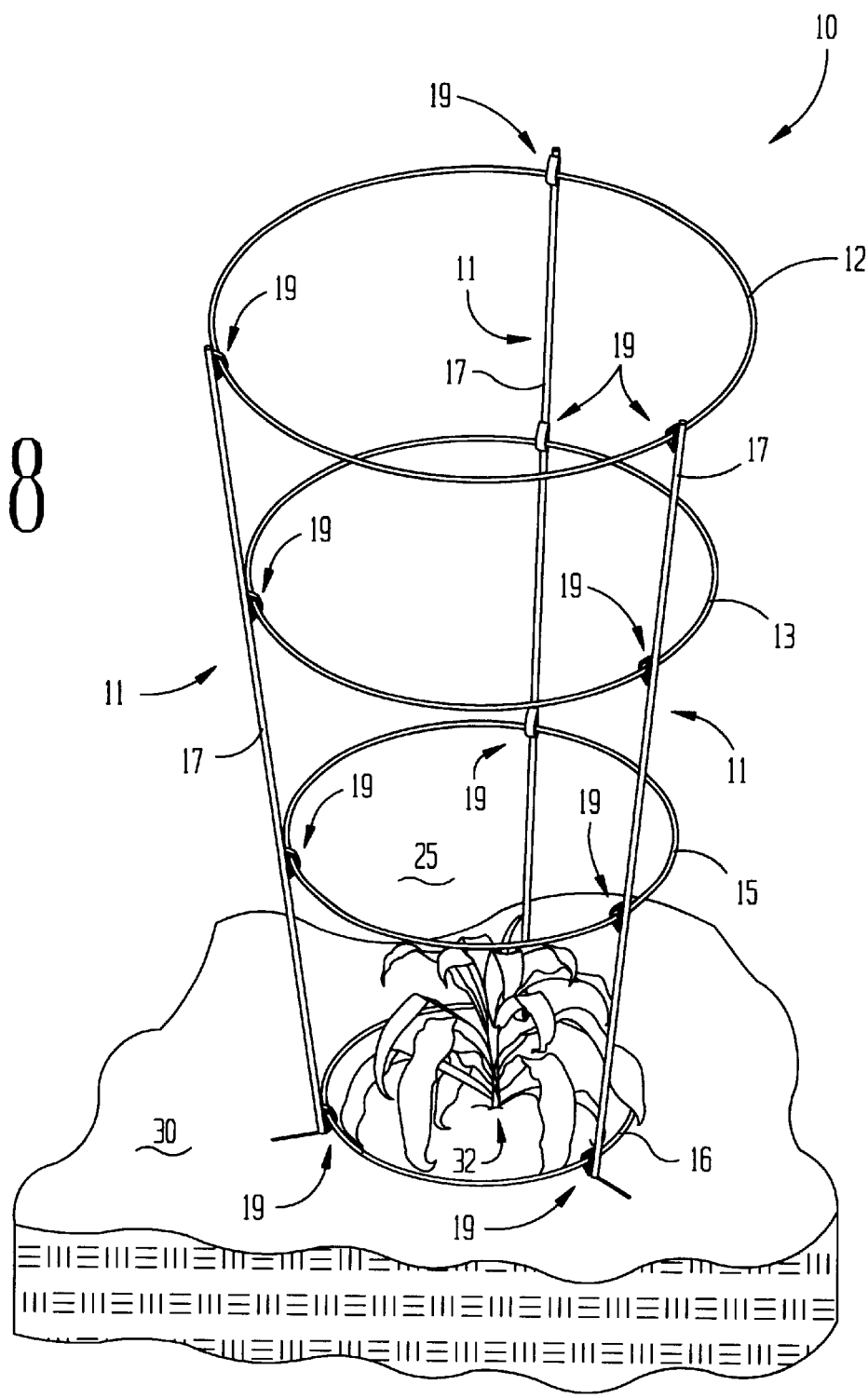

COLLAPSIBLE PLANT SUPPORT STRUCTURE

CROSS REFERENCE TO RELATED APPLICATIONS

Not applicable.

STATEMENT OF FEDERALLY SPONSORED RESEARCH OR DEVELOPMENT

Not applicable.

BACKGROUND

Gardeners, ranging from the professional to the casual, have used plant supports since before recorded time. There have been innumerable alternatives devised for providing auxiliary Support to a growing plant. These alternatives range from a single stake in the ground to an automated, high-tech, controlled environment greenhouse. Despite the myriad of alternatives historically available, the utility or desirability of any specific alternative is always defined by the totality of the circumstances impacting a given user.

In today's consumer society in the U.S., both the hobbyist and the professional gardener have unique requirements for plant supporters that differ from their historical predecessors of even a few generations ago. These include readily commercial availability (and all the inherent considerations that go into a commercial product), simplicity and ease of use, durability, broad application and efficient storage. Of course, the industry has been motivated to develop a variety of plant supports to address one or more of these desirable features.

A few examples are Allman, U.S. Pat. No. 5,323,559, Benson, U.S. Pat. No. 5,544,446, Booker, U.S. Pat. No. 4,285,163, Glamos, U.S. Pat. No. 5,174,060, Hillstead, U.S. Pat. No. 5,179,799, Lemrick, U.S. Pat. No. 3,299,569, Nahon, U.S. Pat. No. 4,005,548, Rocka, U.S. Pat. No. 6,088,956, and Vogel, U.S. Pat. No. 4,073,091.

Additionally, prior art of similar cages shows that these structures are made of a thin wire that bends easily when trying to place the structure into the ground. They also lack support at ground level to keep the structure from being knocked over by the very plant it supports or a passerby. Also, previous plant structures have little or no way to help stake the structure into the ground.

As evident from the above statements, there still is a need for an effective plant support structure that can be used anywhere from a rooftop garden, to a backyard garden, to a field of plants.

SUMMARY

The present invention is directed to an apparatus that satisfies the need for an effective collapsible plant support structure. The apparatus is comprised of three support rods connected with four cross members. The cross members are spaced equidistantly along the support rods and are of proportionally descending sizes with the bottom cross member used as a structural support. The support rods have footplates and angle a way from the center of the opened structure beginning immediately after the bottom cross member. A footplate assists with placement into a given terrain, as does a tapered end.

Objects and Advantages

Accordingly, several objects and advantages of the invention are an open area to make harvesting the fruit easier, the invention includes tapered tips and footplates to assist in staking the structure to the ground, as well as the invention can also be scaled up or down to help support a potted indoor plant to a plant the size of a large sapling, and the invention is also one collapsible piece making it easier to store as well as set up, along with the traditional cone shape and with the ability to rotate the cross members make it ideal for growing plants from a younger state.

Further objects and advantages of our invention will become apparent from a consideration of the drawings and ensuing description.

DRAWING FIGURES

FIG. 2 is a side lateral view of the invention and illustrates the cross members as they pivot about their connection points.

FIG. 3 is a lateral perspective of the invention as the vertical support rods are rotated about the cross members to an appropriate position for use.

FIG. 8 is a perspective view of the structure opened and in use as a support for a plant or seedling.

REFERENCE NUMERALS IN DRAWINGS

Figure 1:
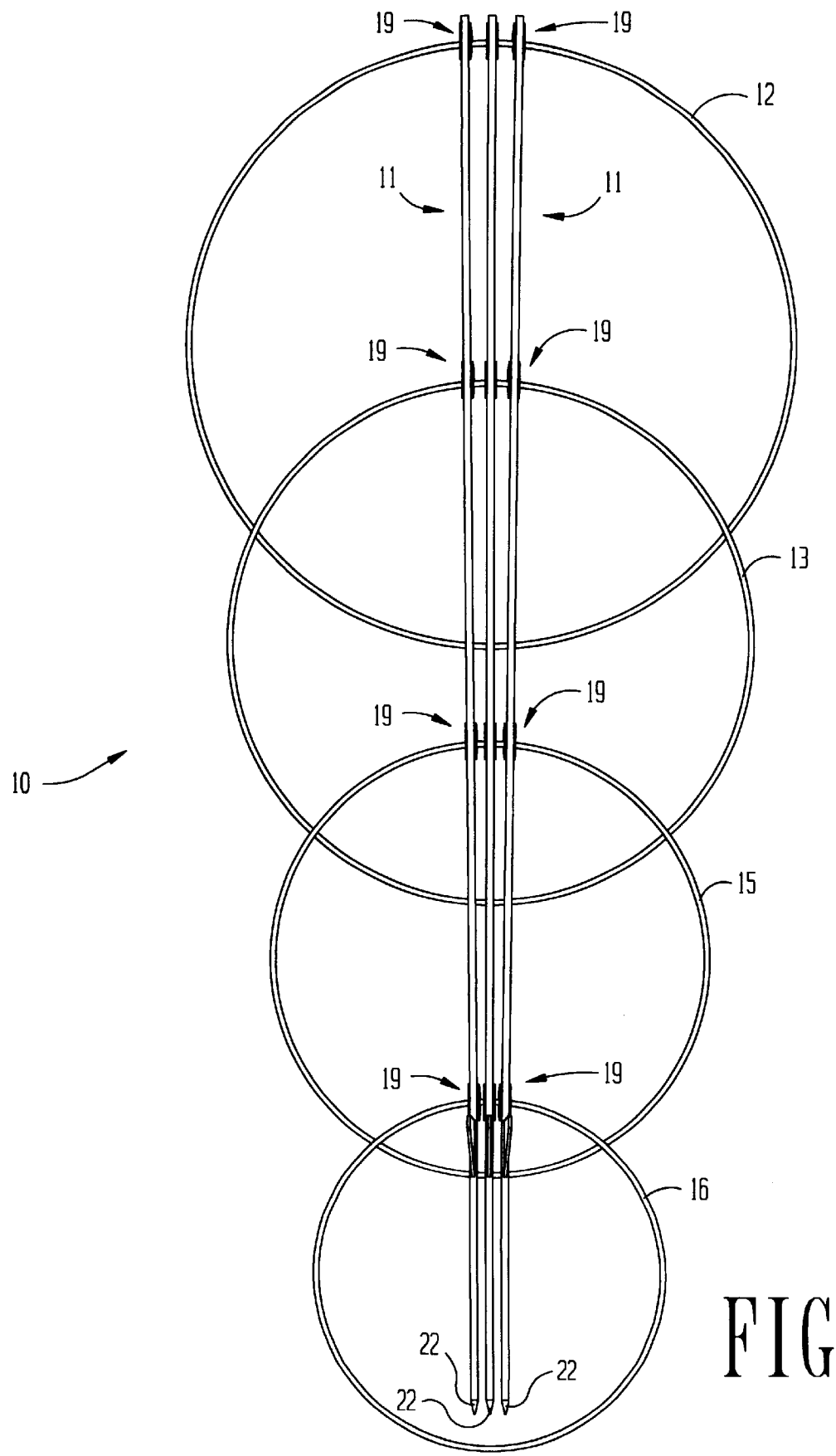
FIG. 1 is a version of the collapsed invention in a front elevation view in its closed state and illustrates the main components of the invention.

10 collapsible plant support
11 vertical support rod
12 upper cross member
13 intermediate cross member
15 intermediate cross member
16 bottom cross member
17 angled vertical support member
18 guide hub
19 connection point
20 footplate
21 pressure area
22 tapered end of rod
24 lowest connection point
25 area of enclosure
28 planter
30 terrain
32 plant

DESCRIPTION

A collapsed view of the plant support structure 10 of the present invention is shown in FIG. 1. The structure consists of three identical vertical support rods 11 made from wood, plastic, or metal. Each vertical support rod has a tapered end 22 and has a cross member linked to it at four different connection points 19. The cross members decrease proportionally in size 12,13,15, and 16 down the vertical support rods.

FIG. 2 shows a profile of the structure beginning to open. With the cross members swinging down from the connection points 19. FIG. 3 shows the vertical support rods being separated and slid around the cross members.

Figure 4:
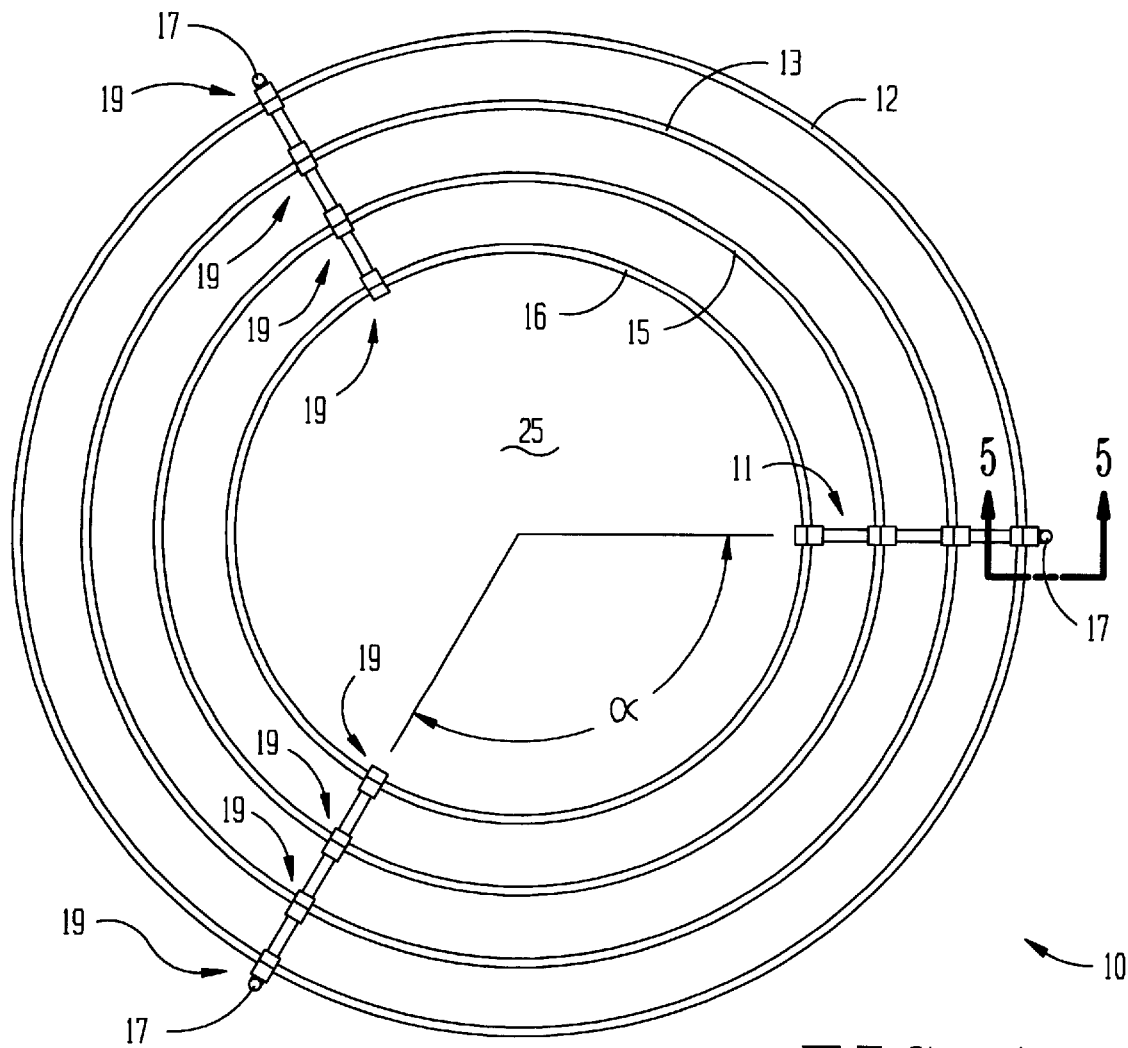
FIG. 4 is a top view of the invention whereas the vertical support rods are in an appropriate position for use.

FIG. 4 is top view of the area of enclosure 25 of the opened structure 10 with the vertical support rods spaced equidistant around the cross members at angle [alpha].

Figure 5:
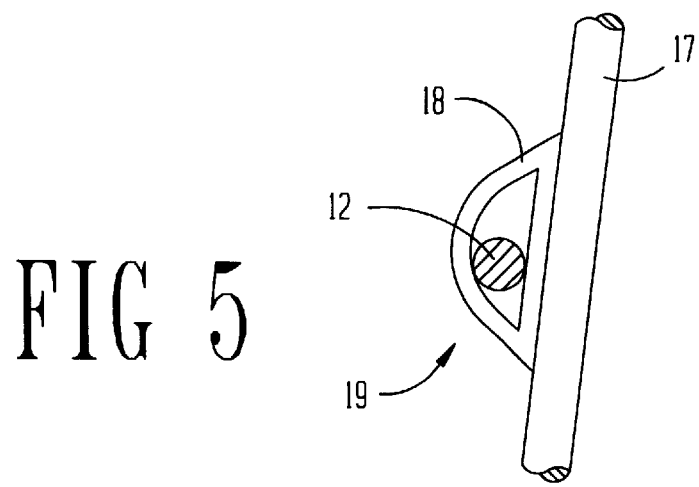
FIG. 5 is a sectional view taken along line 5—5 in FIG. 4 showing the locations and positions of the guide hub, upper cross member, and angled vertical support member while the invention is in use.

FIG. 5 is a close-up of the connection point 19 where a guide hub 18 on an angled vertical support member 17 connects a cross member 12.

Figure 6:
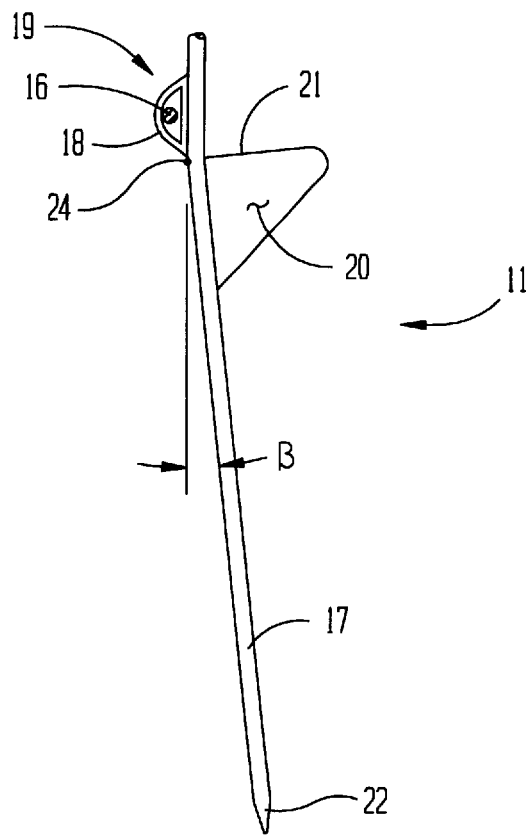
FIG. 6 is a side elevation of the vertical support rod with portions being broken away to show the lower particulars of said support.

FIG. 6 shows a close-up of the angle [beta] of the angled vertical support member 17, the footplate 20, the pressure area 21 of the footplate, and the tapered end 22.

Figure 7:
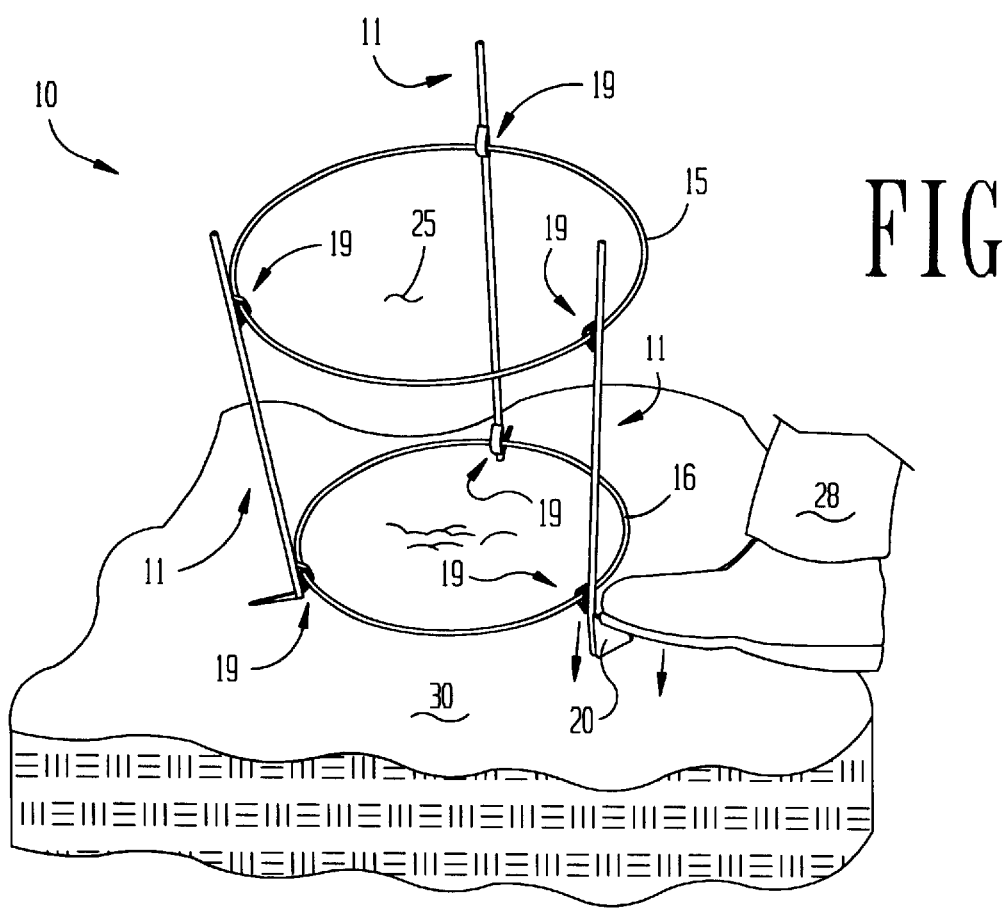
FIG. 7 is a perspective view of a version of the invention with portions being broken away to show the implementation of the structure within the terrain.

FIG. 7 demonstrates how the planter 28 places his foot on the footplate when placing the structure into the terrain 30.

FIG. 8 is the invention completely erected with a plant 32 growing in the middle.

While there is shown and described herein certain specific structure embodiments of the invention, it may be manifest to those skilled in the art that various modifications and rearrangements of the parts may be made without departing from the spirit and the scope of the underlying inventive concept and that the same is not limited to the particular forms herein shown and described except insofar as indicated by the appended claims.

OPERATION-FIGS. 2,3,4,5, 7 AND 8

The manner of opening the plant support structure is to hold the structure parallel to the ground so that the cross members fall, perpendicular to the ground from the vertical support rods 11, under the power of their own weight as shown in FIG. 2. Second, hold the middle vertical support rod and slide the remaining vertical support rods equidistant from each other [alpha] (FIG. 4) and the middle vertical support rod as shown in FIG. 3. Next, turn the structure so that the tapered ends 22 (FIG. 6) of the vertical support rods are facing the ground. Use the footplates 20 (FIGS. 6 and 7) to place the structure into the ground as demonstrated by the planter 28 placing his foot on the pressure area 21 (FIG. 6) as shown in FIG. 7.

As shown in FIG. 5, a cross member is connected to a vertical support rod at the connection point 19 by a guide hub 18. This provides for easy collapsing as well as sliding the vertical support rods around the cross members.

FIG. 4 shows the decreasing size of the cross members as they approach the ground giving the plant room to grow and to be supported.

In FIG. 7 the bottom cross member 16 is used as an added support along with the outward angle [beta] of the angled vertical support members 17 as shown in FIG. 6.

In FIG. 8 the plant 32 grows in the area of enclosure 25 using the vertical support rods and cross members for support.

CONCLUSION, RAMIFICATIONS, AND SCOPE

Thus the reader will see that our collapsible support structure provides a more efficient structure with which to grow plants and trees and makes harvesting fruit easier. Our cage is stronger, easier to assemble and collapse, yet a device that can be used by persons of almost any age as well as in almost any location due to the ease of scalability.

While our above description contains many specifics, these should not be construed as limitations on the scope of the invention, but rather as an exemplification of one preferred embodiment thereof. For example, the ability to have different colors, added or subtracted cross members, and added string for additional support.

Accordingly, the scope of the invention should be determined not by the embodiments illustrated, but by the appended claims and their legal equivalents.

What is claimed is:

1. A collapsible plant support structure comprising:
   a plurality of elongated support members each having:
      an elongated, Vertically orientable upper longitudinal portion,
      an elongated lower longitudinal portion laterally outwardly angled relative to said vertically orientable upper longitudinal portion and having a lower end spaced downwardly apart from a juncture area between said upper and lower longitudinal portions and being drivable into the ground, and
      a foot-drivable structure extending laterally outwardly from said lower longitudinal portion at said juncture area between said upper and lower portions and s aced upwardly apart from said lower end of said lower longitudinal portion,
         said foot-drivable structures being useable to facilitate the forcible placement of said lower ends of said lower longitudinal portions of said support members into the ground; and
   a plurality of vertically spaced apart cross members,
      said cross members being secured to said support members for pivotal movement relative thereto between operative and collapsed positions in which said cross members respectively lie in planes generally transverse and parallel to said upper longitudinal portions, said cross members including a lowermost cross member secured to said support members at said juncture areas between their upper and lower longitudinal portions, whereby, using said foot-drivable structures, said lower longitudinal portions of said support members may be foot-driven into the ground to place s aid lowermost cross member at ground level,
      said support members being slidable around said cross members between operative and collapsed positions In which said support members are respectively in circumferentially spaced and laterally adjacent orientations.

2. The collapsible plant support structure of claim 1 wherein:
   said cross members have circular configurations.

3. The collapsible plant support structure of claim 2 wherein:
   each upwardly successive cross member has a diameter greater than the downwardly preceding cross member.

4. The collapsible plant support structure of claim 1 wherein:
   each foot-drivable structure has a generally plate-like configuration.

5. The collapsible plant support structure of claim 4 wherein:
   each foot-drivable structure has a top side edge extending generally transversely to its associated lower support member longitudinal portion.

6. The collapsible plant support structure of claim 5 wherein:
   each foot-drivable structure has a generally triangular shape.

7. The collapsible plant support structure of claim 1 wherein:

each of said lower ends of said lower longitudinal portions of said support members has an essentially straight configuration along its length, and a sharpened lower end.

8. The collapsible plant support structure of claim 1 wherein:

with said support members and said cross members in said collapsed positions thereof said cross members are staggered relative to one another in a direction parallel to the lengths of said upper longitudinal portions of said support members.

9. The collapsible plant support structure of claim 1 wherein:

said collapsible plant support structure has three of said support members and four of said cross members.

10. The collapsible plant support structure of claim 1 wherein:

said upper longitudinal portions of said support members have substantially straight configurations along their lengths, and said upper longitudinal portions of said support members have separate guide hub structures anchored thereto, and through which said cross members pivotally and slidably extend.

11. A collapsible plant support structure comprising:

a plurality of elongated support members each having:
an elongated, Vertically orientable upper longitudinal portion,
an elongated lower longitudinal portion having a lower end spaced downwardly apart from a juncture area between said upper and lower longitudinal portions and being drivable into the ground, and
a foot-drivable structure extending laterally outwardly from said lower longitudinal portion at said juncture area between said upper and lower portions and spaced upwardly apart from said lower end of said lower longitudinal portion,
said foot-drivable structures being useable to facilitate the forcible placement of said lower ends of said lower longitudinal portions of said support members into the ground; and a plurality of vertically spaced apart cross members,
said cross members being secured to said support members for pivotal movement relative thereto between operative and collapsed positions in which said cross members respectively lie in planes generally transverse and parallel to said upper longitudinal portions, said cross members including a lowermost cross member secured to said support members at said juncture areas between their upper and lower longitudinal portions, whereby, using said foot-drivable structures, said lower longitudinal portions of said support members may be foot-driven Into the ground to place said lowermost cross member at ground level.

* * * * *